United States Patent

[11] 3,587,890

[72] Inventors John E. Hyland
 Woodstock, Province Ontario;
 Frank C. McLaughlin, Toronto, Province Ontario, Canada
[21] Appl. No. 832,308
[22] Filed June 11, 1969
[45] Patented June 28, 1971
[73] Assignee Alcan Research and Development Limited
 Montreal, Quebec, Canada

[54] METHOD FOR MOVING A HOUSE SECTION OR THE LIKE
9 Claims, 22 Drawing Figs.

[52] U.S. Cl. ................................................ 214/152,
 214/1, 214/44, 238/13, 280/106, 280/405
[51] Int. Cl. .............................................. B65g 67/24
[50] Field of Search .......................................... 214/1 (H),
 38.22, 515, 152; 238/13; 52/122, 143, 745

[56] References Cited
UNITED STATES PATENTS
3,231,121 1/1966 Powell ........................... 214/515
3,505,767 4/1970 Fyle .............................. 52/143

Primary Examiner—Robert G. Sheridan
Attorneys—Robert S. Dunham, P. E. Henninger, Lester W. Clark, Gerald W. Griffin, Thomas F. Moran, Howard J. Churchill, R. Bradlee Boal, Christopher C. Dunham and Robert Scobey ABSTRACT: A trailer for moving a preassembled house section to a foundation, including a pair of longitudinal beams and two pairs of removable load-supporting wings extending outwardly from the beams adjacent to the front and rear of the trailer, respectively, each wing having a threaded bolt projecting upwardly to engage the base frame of the house section. For transport of the house section, the bolts are turned to effect vertical separation of the wings and base frame, causing the beam ends to bend downwardly until the house section rests on and is stably supported by the central portions of the beams. Upon arrival at the foundation site, the trailer is positioned to align the house section with the foundation, which supports a pair of removable horizontal tracks extending transversely of the aligned house section. The trailer structure further includes two pairs of lifting wings, which are pivotally attached to the trailer beams at forward and rearward localities, respectively, after the trailer is thus positioned; one lifting wing of each pair is extensible and is disposed on the side of the trailer facing the foundation. These lifting wings are pivoted upwardly until they are stopped by abutment with the beams, being then disposed in horizontal position projecting outwardly from the beams, aligned with the tracks and supporting the house section base frame. Thereafter the trailer and house section are elevated to the level of the foundation tracks by jacking up the lifting wings, the load-supporting wings being detached from the trailer; the two extensible lifting wings are extended to engage the tracks, and the house section is slid from the trailer to the foundation across the lifting wings and tracks, which are subsequently disassembled and removed from the foundation.

Fig. 1.

INVENTORS
JOHN E. HYLAND
FRANK C. MCLAUGHLIN
BY Christopher C. Dunham
ATTORNEY

METHOD FOR MOVING A HOUSE SECTION OR THE LIKE

BACKGROUND OF THE INVENTION

This invention relates to apparatus and procedures for transporting a preassembled house section or like building unit to a foundation side and transferring it to a foundation at the site. More particularly, the invention is directed to trailer structures for effecting such transport and for facilitating such transfer, and to procedures utilizing these structures.

In house prefabrication and related arts, it is sometimes desired to preassemble building units such as houses or sections thereof at an assembly plant, and to transport the assembled units over extended distances to the foundations on which they are to be placed. For example, a house may be more or less fully preassembled and transported in two longitudinal halves or sections which are placed side by side on a foundation to constitute the complete house. Such preassembly techniques afford advantages with respect to ease, economy and rapidity of house construction.

The transport of a preassembled house section from assembly plant to foundation site, and the transfer of the house section to a foundation at the latter site, present substantial difficulties. A house section as herein contemplated is a very large, heavy and bulky article, and is usually transported by means of a tractor-drawn trailer; to avoid damage to the section, it must be stably supported during transport. Upon arrival at the site, it must be transferred as a single unit to a foundation, with proper support maintained during transfer. The foundation level is ordinarily higher than the level of the house section on the trailer, and hence the house section must be moved vertically as well as horizontally to effect such transfer; moreover, the extent of vertical displacement required varies in accordance with differences in individual foundation levels relative to the adjacent terrain.

In order to realize fully the economic and other advantages of preassembly, especially for production of housing units in large numbers, it is important that the transporting and transferring operations be performable in a simple, safe, convenient and expeditious manner, involving a minimum of equipment and procedural steps, and affording ready adaptability to variations in positions and dimensions.

SUMMARY OF THE INVENTION

The present invention in one aspect broadly contemplates the provision of a trailer structure for transporting a house section or the like, including a trailer frame having wheels, adapted to be connected at its forward end to a powered vehicle for drawing the trailer, and comprising a pair of elongated beams extending horizontally lengthwise of the trailer in fixed spaced parallel relation to each other, the upper surfaces of these beams lying in a common horizontal plane entirely above the trailer wheels. Two pairs of load-supporting wings are respectively disposed adjacent to the forward and rearward ends of the trailer; each pair of wings comprises two bars respectively rigidly secured to and projecting horizontally outward from the beams in opposed directions, and respectively extending beneath opposite bottom edge portions of the base frame of the house section. In addition, each wing bears load-distributing means including an element (such as a bolt threaded axially vertically through the wing) projecting above and adjustable in position relative to the wing on which it is carried, for bearing upwardly against the base frame to effect vertical separation of the wing and base frame.

With this structure, when a house section is positioned on the trailer, the load-distributing bolts of the four wings are adjusted upwardly into engagement with the base frame of the house section, vertically separating the wings from the base frame and thereby depressing the end portions of the trailer frame relative to its central portion by downward bending of the ends of the beams until the central portion of the base frame rests upon the central portions of the beams. The house section is thus stably supported, not only near its ends by the load-distributing bolts but also at its center by the upwardly bowed trailer frame beams, and may be safety transported on the trailer over extended distances without damage.

Preferably, the trailer is connected to a conventional fifth-wheel hitch on a tractor or like powered vehicle by means of a gooseneck, with a vertically disposed heavy cylindrical pin providing the connection between the trailer and the gooseneck. A nose frame secured to the forward end of the trailer is received within a recess in the gooseneck in such position that cooperating bushings respectively carried by the gooseneck and the trailer nose frame are vertically aligned to receive the pin. This pin, inserted in the bushings, is designed to withstand the shear forces exerted thereon incident to stopping and starting of the tractor and trailer, and by the tendency of the load to undergo vertical and horizontal displacement relative to the tractor during transport.

The trailer structure of the invention further includes two pairs of lifting wings respectively disposed at forward and rearward localities of the trailer frame. Each pair of lifting wings comprises two elongated rigid members respectively disposed outwardly of and adjacent to the beams, each of the elongated rigid members being pivotally mounted at its inner end to the trailer frame for angular displacement about an axis parallel to the long axis of the beams, this inner end being shaped and disposed to bear against the adjacent one of the beams upon upward pivotal movement of the elongated rigid member into axially horizontal position, thereby to prevent further upward pivotal movement of the elongated rigid member. Each of the elongated rigid members, when in this axially horizontal position, is disposed to support a portion of the house section base frame, and has an upper surface lying substantially in a common plane with the upper surfaces of the beams so as to define, with the beam upper surfaces, an effectively rigid platform for sliding horizontal movement of the base frame in a direction transverse to the direction of trailer movement. Each of the elongated rigid members is further adapted to be engaged by lifting means (such as jacks) for supporting and elevating the elongated rigid members and thereby supporting and elevating the trailer frame.

The described lifting wings are detachable from the trailer frame, and are pivotally mounted thereon after the trailer and house section have arrived at a foundation site and have been positioned for transfer of the house section to a foundation. When the lifting wings are in place, the trailer and house section are simultaneously elevated to the level of the foundation by means of jacks positioned beneath and engaging the lifting wings. The aforementioned load-supporting wings are also mounted detachably to the trailer frame and are removed therefrom once the lifting wings are brought into horizontal position supporting the house section.

Two of the lifting wings (i.e. two of the rigid elongated members just mentioned), both positioned adjacent to the same one of the beams, each have an axially extending and outwardly opening recess. A pair of rigid extension bars are respectively received within the recesses of these two rigid elongated members and are movable outwardly relative thereto so as to constitute extensions of the two rigid elongated members respectively supported at their inner ends within the two rigid elongated members.

The invention in a further aspect additionally contemplates the provision of a removable track or beam structure extending across the top of a foundation and including a pair of spaced parallel horizontal tracks for supporting a house section as it is moved from the above-described trailer onto the foundation. Each of these tracks comprises a pair of brackets respectively mounted on two parallel sidewalls of the foundation in opposed relation to each other, each bracket including an inner bracket member and an outer bracket member respectively bearing against the inner and outer surfaces of the foundation wall on which the bracket is mounted, one of the bracket members of each bracket including a horizontal leg extending across the foundation wall upper rim and secured to the other bracket member so that the wall is clamped between the bracket members, at least one of the outer bracket members having an outward projection, each inner bracket member having an inwardly projecting shelf for supporting one end of a beam or track, the horizontal legs of the pair of brackets having aligned and essentially coplanar horizontal upper surfaces, and the shelves of the pair of brackets being offset downwardly with respect to the last-mentioned surfaces; and a beam or track extending between and supported at its ends on the shelves of the pair of brackets, this track having an upper surface essentially coplanar with the upper surfaces of the bracket legs and cooperating therewith to constitute an essentially continuous rectilinear horizontal track extending across the foundation and both sidewall rims thereof, the bracket outward projection being adapted to support one end of one of the aforementioned extension bars which extends outwardly therefrom to constitute an extension of the rectilinear track.

These two tracks are so positioned on the foundation as to be aligned with the two pairs of lifting wings on the trailer, so that upon elevation of the trailer to the foundation level, the lifting wing extension bars may be extended outwardly from the trailer and respectively into engagement with the two bracket outward projections.

In practicing the method of the present invention, for transporting a house section on the described trailer to the site of a foundation from a remote locality, the house section is positioned on the trailer (having the load-supporting wings secured thereto) and the house section base frame is separated vertically from the subjacent load-supporting wings, by the load-distributing means, for effecting downward bending of the forward and rearward ends of the trailer relative to the central portion of the trailer until the base frame bears against that central portion. The trailer is connected to a powered vehicle and drawn to the foundation site, where it may be detached from the powered vehicle and wheeled by appropriate means to a position, adjacent to the foundation, in which the sides of the base frame are parallel to the sides of the foundation and the ends of the base frame are aligned with the ends of the foundation.

With the trailer thus positioned, the two pairs of lifting wings are mounted thereon, and pivoted upwardly to the substantially horizontal positions in which the lifting wings engage and support opposite side edges of the base frame. The load-supporting wings are removed, and the lifting wings are supported and elevated by jacks to the level of the foundation upper rim. The two lifting wing extension bars are then respectively extended into engagement with the outward projections of the support brackets of the two tracks (previously mounted on the foundation), so that the lifting wings, extension bars and tracks together constitute a pair of essentially horizontal continuous rails leading from the trailer over the foundation. The house section is slid across the upper surface of the trailer, the extensible lifting wings, and the tracks, into its desired place on the foundation.

The foundation may be provided, in conventional manner, with a plate mounted on its upper rim, and the tracks may extend through gaps in this plate, the track upper surfaces lying at a level slightly lower than the upper surface of the plate. As the lifting wings are initially pivoted upwardly to the support the house section base frame on the trailer, slide elements having a thickness slightly greater than the difference in level between the tracks and plate may be interposed between the lifting wings by and the base frame so that the base frame is spaced above the lifting wings by thickness of the slide elements. These slide elements move with the base frame over the extensible lifting wings and the tracks, and when the house section is in place, it is pried up slightly to enable removal of the slide elements. The house section then rests on the plate, being still spaced slightly above the tracks. After the house section is in place, the tracks are removed from their brackets and these brackets are disassembled and removed through the gaps in the plate.

With the described apparatus and procedures, a house section may be transported with stable support, from a remote locality to a foundation site, and the transporting trailer may be used as a platform on which the house section is elevated to the foundation level and from which it is transferred by sliding movement onto the foundation, in a simple, safe and operationally convenient manner.

DETAILED DESCRIPTION

Referring to the drawings, the invention is illustrated as embodied in procedures and apparatus for transporting a house section 10 and transferring it to a foundation 11.

The house section 10 is an essentially entirely preassembled longitudinal one-half section of a generally conventional frame house of rectangular plan. Thus, section 10 is itself rectangular in plan, as long as the complete house and half as wide, and comprises a rigid frame building unit having a roof 12, sidewall 14, end walls 16, and a rectangular base frame 17. The base frame (best seen in FIGS. 11—18) includes a plurality of conventional parallel joists 18, two parallel horizontal side frame members 19 extending along and projecting downwardly from opposite sides of the base frame, and two parallel horizontal end frame members 20 extending along and projecting downwardly from opposite ends of the base frame.

The foundation 11 is also rectangular in plan, dimensioned to support the complete house, and is constituted of generally conventional vertical masonry walls (including two parallel sidewalls 21 and two parallel end walls 22) having upper rims 23 lying in a common horizontal plane. In the construction of a house, the foundation is first established at the desired site. The house, preassembled at an assembly plant remote from the site, is then transported in two separate sections 10 to the site; the two sections 10 are placed side by side on the foundation and joined to provide the complete house.

In accordance with the invention, each house section 10 is transported from the assembly plant to the foundation site on a trailer 25 (FIG. 1), which includes a frame 26 comprising a pair of longitudinal steel I-beams 27 and 28 and a plurality of transverse steel beams 30 extending between and rigidly interconnecting the two longitudinal beams 27 and 28. The longitudinal beams are equal in length to at least a major portion of the longitudinal dimension of the house section, and are disposed in parallel spaced horizontal relation to each other with their upper flanges lying in a common horizontal plane, the spacing between beams 27 and 28 being substantially less than the spacing between the side frame members 19 of the house section base frame 17. The rearward portion of the trailer frame is supported on a plurality of wheels 32 for rolling movement in a direction parallel to the long axes of beams 27 and 28; the wheels are mounted on the trailer frame in conventional manner but are so disposed that the horizontal plane containing the upper flanges of beams 27 and 28 lies entirely above the wheels. This trailer frame is adapted to support the house section 10, which is placed on the frame with its longitudinal centerline in a vertical plane containing the longitudinal centerline of the trailer frame.

As shown in FIGS. 2—6, rigidly secured to the forward ends of beams 27 and 28 is a forwardly tapering V-shaped nose frame 34 comprising a pair of steel beams 35 which extend horizontally forward from the beams 27 and 28 in converging relation to each other. A pair of upwardly opening transverse channel sections 36 are respectively inset into the forward portions of the two beams 35 in position to receive one end frame member 20 of the house section base frame 17 when the house section is placed on the trailer, and thereby to restrain the house section against longitudinal movement relative to the trailer during transport.

Forwardly of the channel sections 36, the nose frame 34 is connected to the vertical leg 38 of a rigid gooseneck 40, by means hereinafter described. The gooseneck 40 has a horizontal arm 42 extending forwardly from the upper portion of leg 38 and bearing in its forward portion a downwardly projecting conventional king pin 44 adapted to engage a conventional fifth wheel hitch of a tractor or like powered vehicle (not shown); the tractor supports the forward end of the trailer, i.e. through the gooseneck, and draws the trailer forwardly for transport of the house section. Connection of the trailer to the tractor through a gooseneck and fifth wheel hitch enables the hitching point to be located forwardly of the tractor's rear axle, so that the trailer load does not tend to unbalance the tractor during transport.

The gooseneck 40 is constructed of steel frame members, and in the lower portion of the vertical leg 42, these members are arranged to define a rearwardly opening pocket or recess 46 for receiving the forward end of the trailer nose frame 34. Cooperating hardened steel bushings 48 and 49, each having an axially vertical circular aperture, are respectively fixedly mounted in the recess-defining portion of the gooseneck leg and on the forward end of nose frame 34, in such position that when the nose frame is received in the recess 46, the apertures of bushings 48 and 49 are vertically aligned. The trailer is coupled to the gooseneck by a pin 50 having an enlarged head 51 and an axially vertical cylindrical shank 52 which is inserted downwardly through the aligned apertures of bushings 48 and 49 so that the head of the pin is disposed above the recess and the pin shank extends entirely through the recess.

The pin may, for example, be fabricated of cold rolled stainless steel and is relatively large in diameter, fitting with nominal clearance through the bushing apertures. The bushings transmit to the pin, as essentially horizontally directed shear forces exerted by the bushings on the pin, forces tending to effect relative displacement of the trailer frame and gooseneck; and the pin has a horizontal diameter selected, with reference to the shear strength per unit horizontal area of the pin material in the configuration used, to withstand shear forces substantially greater than the normal total shear encountered during transport of a house section on the trailer 25.

Figures 2, 3, 4, 5, 6:
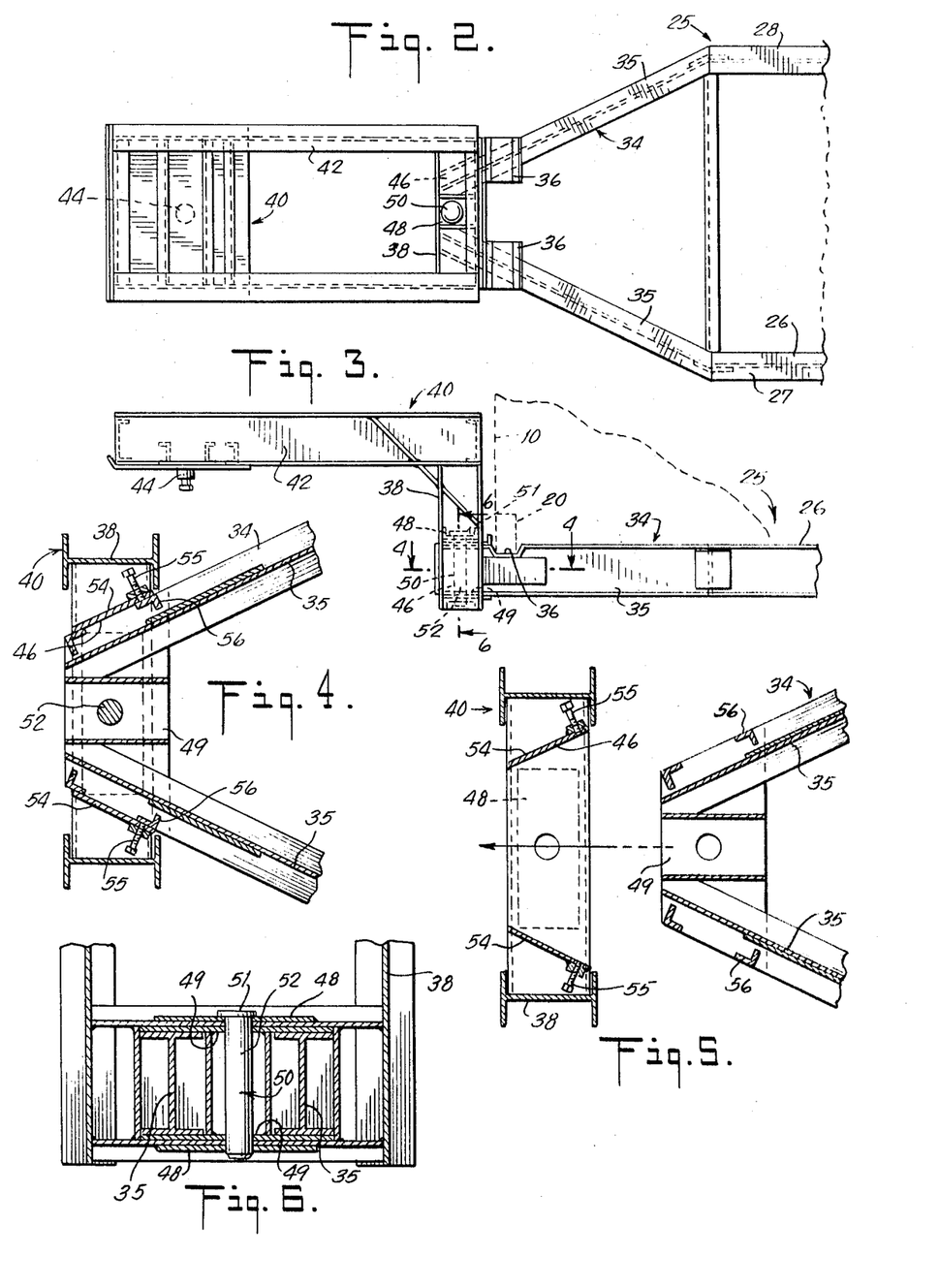
FIG. 2 is a plan view of the nose section of the trailer and the gooseneck connected thereto.
FIG. 3 is a side elevational view of the trailer nose section and gooseneck.
FIG. 4 is a fragmentary sectional plan view taken along the line 4-4 of FIG. 3.
FIG. 5 is a view similar to FIG. 4 but showing the trailer nose section and gooseneck in exploded relation.
FIG. 6 is a fragmentary sectional elevational view taken along the line 6-6 of FIG. 3.
Figure 7:
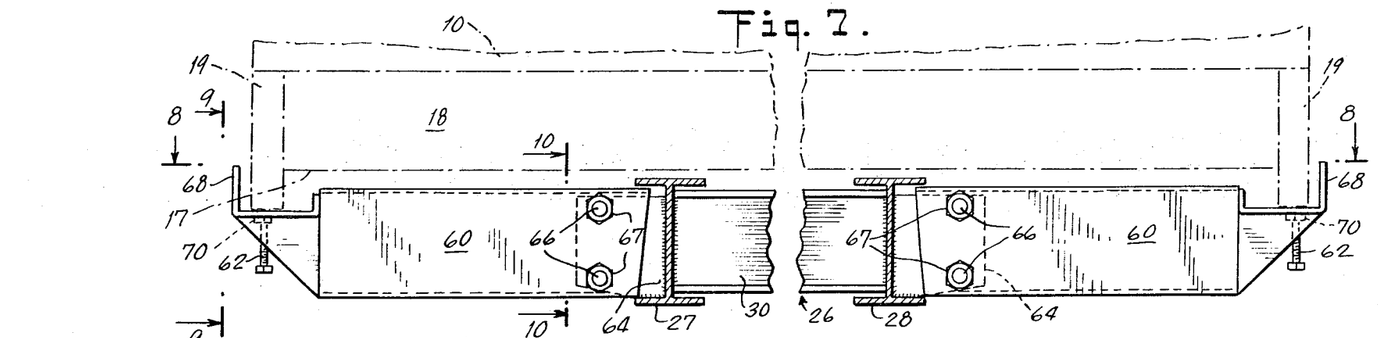
FIG. 7 is a fragmentary view of the trailer and supporting wings taken along the line 7-7 of FIG. 1.
Figure 8:
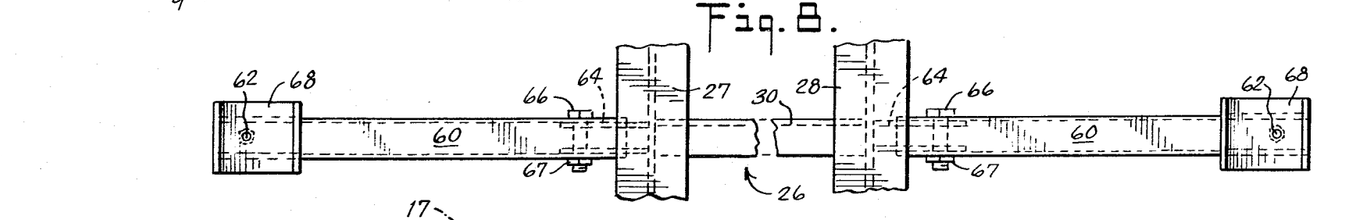
FIG. 8 is a view taken along the line 8-8 of FIG. 7.
Figures 9, 10:
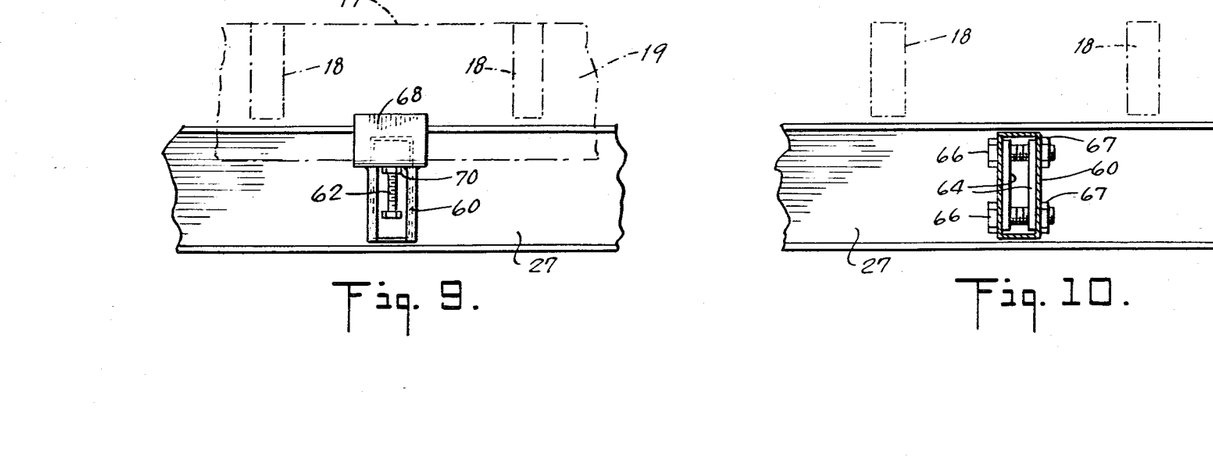
FIG. 9 is a view taken along the line 9-9 of FIG. 7.
FIG. 10 is a view taken along the line 10-10 of FIG. 7.

As shown in FIGS. 4—6, the recess 46 is shaped and dimensioned so that the nose frame, when received therein, is substantially restrained against vertical and lateral movement relative to the gooseneck. In particular, the sides of the recess are defined by forwardly converging vertical sideplates 54 conforming in spacing and orientation to the lateral periphery of the forward end of the nose frame. Respectively threaded in the plates 54 are a pair of inwardly projecting, axially horizontal bolts 55, positioned for alignment with vertical angle members 56 mounted in the two sides of the forward end of the nose frame. These bolts are tightened into bearing engagement with the angle members 56 to restrain the nose frame rigidly against horizontal movement relative to the gooseneck.

The described connection of the trailer to the gooseneck, including pin 50 in bushings 48 and 49, provides a safe, secure and rigid coupling which can nevertheless be rapidly coupled and uncoupled. Also, the pin socket defined by the apertures of bushings 49 in the nose frame is inherently adapted to afford ready connection of the trailer to a conventional coupling device of a bulldozer or like vehicle for moving the trailer at the foundation site, after the trailer has been delivered to the foundation site and disconnected from the gooseneck.

As a particular feature of the present invention, for transport of a house section 10 on the trailer 25 (e.g. from an assembly plant to a foundation site), two pairs of load-supporting wings 60 each carrying load-distributing means comprising a bolt 62 are mounted on the trailer frame, respectively adjacent to the forward and rearward ends thereof; each of these pairs of wings comprises two horizontally elongated box bars respectively projecting horizontally outward from the longitudinal beams 27 and 28, in opposed directions perpendicular to the long axes of the latter beams.

To support the wings 60, as shown in FIGS. 7—10, each of the beams 27 and 28 bears on its outer surface two outwardly projecting brackets 64 respectively disposed adjacent to the forward and rearward beam ends, each bracket 64 comprising a pair of spaced rigid plates. The open inner ends of the four wings 60 are respectively fitted over the four brackets 64. Each wing 60 is rigidly secured to its associated bracket by means of a pair of vertically spaced bolts 66, held in place by nuts 67.

At its outer end, each of the wings 60 bears a short upwardly opening channel member 68 positioned and dimensioned to receive a bottom edge portion of a house section base frame side member 19 that lies outwardly of but parallel to the longitudinal beam (27 or 28) to which the wing is connected, i.e. when a house section 10 is positioned for transport on the trailer. Thus the forward and rearward pairs of wings 60 respectively underlie and receive (in their channel members) forward and rearward portions of the two base frame side members.

The load-distributing bolts 62 are respectively threadedly mounted in sockets 70 in the outer portions of the four wings 60, so as to project upwardly through the channel members 68 in position to bear upwardly against the bottom edge portions of the base frame side members 19 respectively received in these channel members. Each of the bolts 62 can be adjustably advanced upwardly relative to the channel member 68 through which it projects, by turning the bolt in its socket. As the upper end of a bolt 62 is thus moved upwardly above its associated channel member 68, it pushes upwardly against the base frame side member 19 received in the channel member; concomitantly the bolt pushes downwardly against the threads of its socket 70 and hence against the wing 60 in which it is mounted. Such upward displacement of a bolt 62 thereby effects vertical separation of the wing 60 carrying the bolt, and the portion of the base frame side member 19 immediately above that wing.

Figure 11:
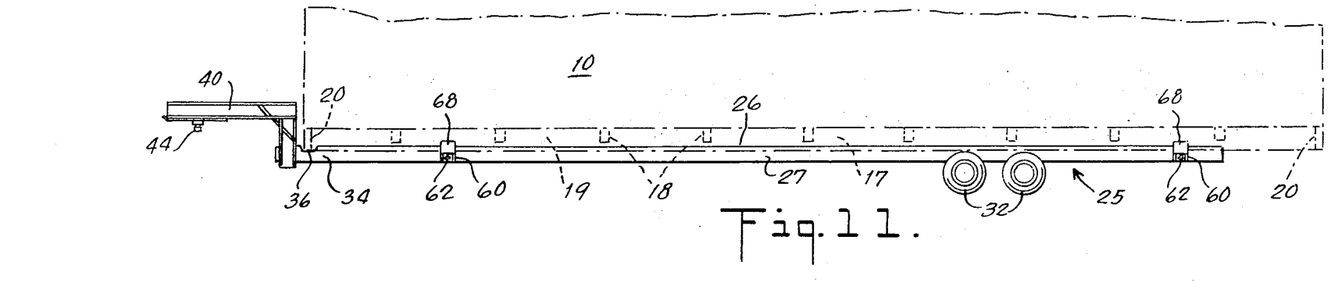
FIG. 11 is a side elevational view of the trailer with the supporting wings in place.
Figure 12:
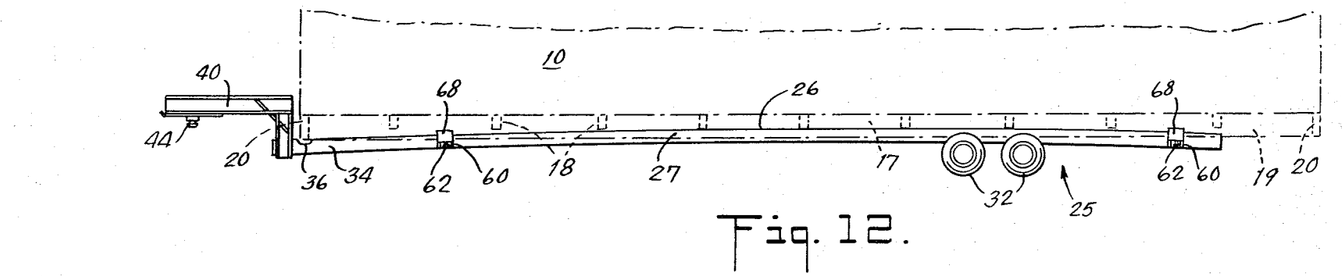
FIG 12 is a view similar to FIG. 11 but showing the bending of the trailer beams effected by adjustment of the load-distributing bolts on the supporting wings.

Although the longitudinal beams 27 and 28 are relatively rigid, and in unstressed condition are axially rectilinear and horizontal (as shown in FIG. 11), they are nevertheless capable of significant longitudinal bending, and in particular, are more flexible than the highly rigid base frame 17 of the house section 10. Accordingly, when all four bolts 62 are adjusted upwardly to vertically separate the end portions of the base frame side members 19 from the subjacent load-supporting wings 60, the opposite ends of each beam 27 and 28 are forced downwardly, relative to the beam central portion; i.e. the weight of the house section, bearing against the four bolts 62, produces downward bending of the ends of the longitudinal beams. The bolts 62 may be adjusted to effect sufficient downward bending of the longitudinal beam ends to cause the central portion of the house section base frame to rest against the central portions of the beams 27 and 28, as seen in FIG. 12.

In use of the described trailer structure in accordance with the method of the invention, the trailer 25 is connected by the gooseneck 40 to a conventional tractor, and a house section 10 is placed on the trailer in such position that the longitudinal centerline of the house section is aligned with the longitudinal centerline of the trailer frame 26. The forward end frame member 20 of the house section base frame is received in the channel sections 36, and the side frame members 19 of the base frame, overhanging the trailer beams 27 and 28, are received near their forward and rearward ends in the channel members 68 of the load-supporting wings 60, which are bolted on the trailer frame.

The load-distributing bolts 62 are adjusted upwardly by turning, to effect vertical separation of the base frame end portions from the wings 60, and thereby to bend the ends of beams 27 and 28 downwardly until the central portion of the base frame comes to rest against the upwardly bowed central portions of these beams. The house section is thus supported at its central portion, as well as being supported on the bolts 62 near its ends; also, it is restrained against longitudinal and lateral movement relative to the trailer, by the channel sections 36 and channel members 68, respectively.

Figure 1:
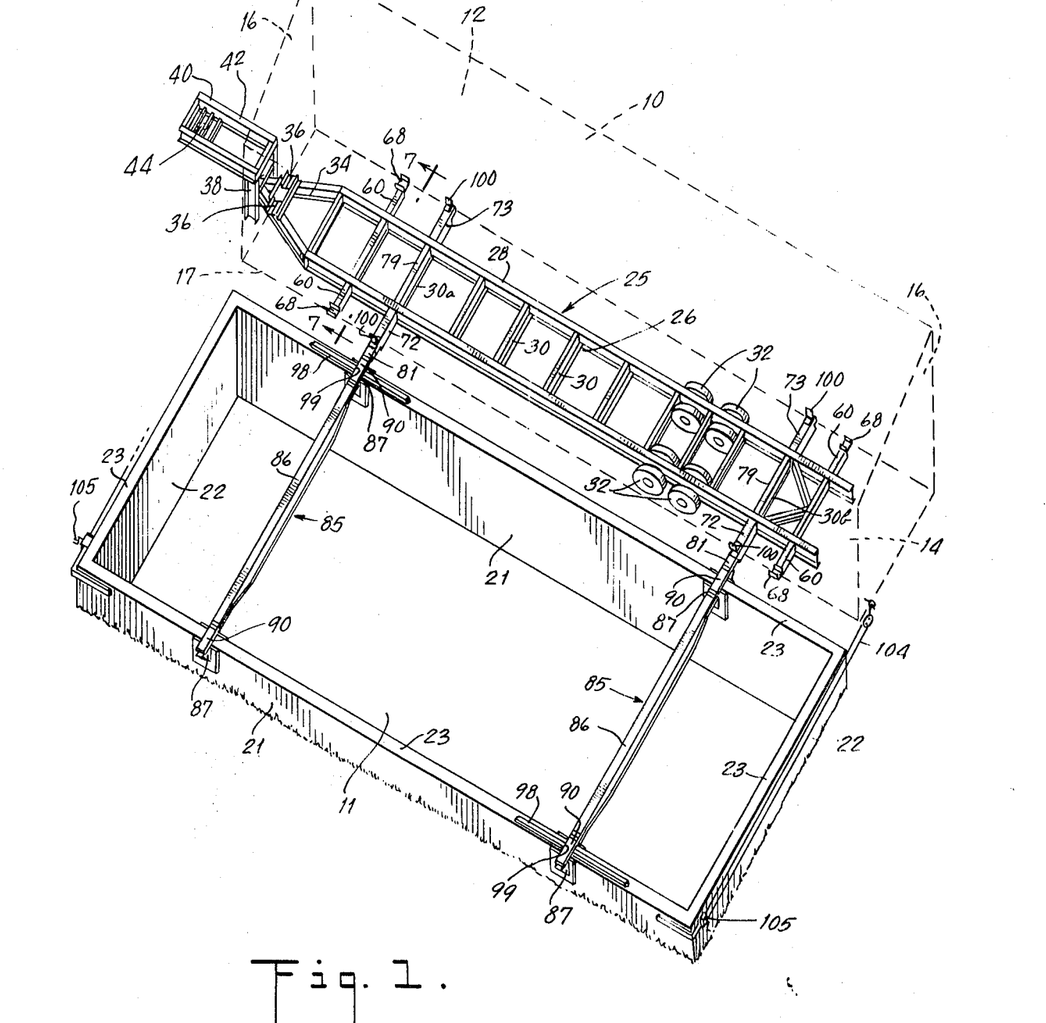
FIG. 1 is a perspective view of a trailer and foundation incorporating the apparatus of the present invention in an illustrative embodiment.

The trailer and house section are drawn to the foundation site by the tractor. At the foundation site, the trailer is moved into a position, alongside the foundation 11, in which the sides of the house section base frame are parallel to the foundation sidewalls 21 and the ends of the house section base frame are aligned with the foundation end walls 22, as shown in FIG. 1, to orient the house section properly for transfer to the foundation. In FIG. 1, the house section 10 illustrated in dotted lines is the first of the two house sections that are to be placed on the foundation 11; hence the trailer is so oriented that the outer sidewall 14 of the house section faces the foundation, and the trailer beam 27 (underlying the house section sidewall 14) is disposed on the side of the trailer nearest to the foundation; when the trailer is in the position just described, beam 27 extends in parallel, adjacent but spaced relation to the near sidewall 21 of the foundation.

Preferably, the trailer is detached from the tractor and gooseneck upon delivery to the foundation site, and is moved into the described position alongside the foundation 11 by means of a bulldozer or like vehicle coupled to the nose frame 34. It is found to be easier to move the trailer into proper position with a bulldozer than with the conventional truck tractor that transports it to the foundation site; also, conditions at the foundation site may sometimes necessitate delay before the trailer can be moved into position alongside the foundation, and it is desirable to free the tractor and gooseneck as soon as possible for return to the assembly plant to transport another trailer and house section.

Further in accordance with the invention, and as particularly illustrated in FIGS. 13—15 and 21, after the trailer has been positioned adjacent to the foundation 11 two pairs of lifting wings are mounted on the trailer frame at forward and rearward localities thereof, respectively. Each pair of lifting wings includes two wings respectively designated 72 and 73 and respectively pivotally connected to the longitudinal trailer frame beams 27 and 28 in aligned relation with one of the transverse beams 30; i.e. the forward pair of lifting wings are respectively disposed outwardly of opposite ends of a forward transverse beam 30a, while the rearward pair of lifting wings are respectively disposed outwardly of opposite ends of a rearward transverse beam 30b. Preferably, as shown in FIG. 1, the lifting wings are closer to the central portion of the trailer frame than are the load-supporting wings 60.

Each of the lifting wings 72 and 73 comprises an elongated box beam having a flat upper surface. To support these wings, each of the beams 27 and 28 carries two fixed brackets 74 projecting transversely outward from its outer surface at the localities of attachment of the lifting wings. Each bracket 74 bears a pivot pin 75 extending in axially parallel relation to the beams 27 and 28.

The inner end of each lifting wing fits over one of the brackets 74 and has a downwardly opening notch 76 that receives the pivot pin 75 of that bracket, so that the pivot pin supports the wing for upward pivotal movement about the pin axis, into a horizontal position in which the inner edge 77 of the wing engages the top flange of the adjacent beam 27 or 28 to prevent further upward pivotal movement of the wing. In this horizontal position, the wing 72 or 73 projects perpendicularly outward from the adjacent beam 27 or 28; its upper surface is essentially coplanar with the upper surface of the latter beam, and underlies a portion of the base frame side member 19 disposed outwardly of that beam, to engage and support that side member.

Each of the four lifting wings is adapted to be engaged by a jack 78 positioned beneath it. When the lifting wings are pivoted up to their described horizontal position, with four jacks 78 respectively disposed beneath and supporting them, upward elevation of the lifting wings by the jacks raises the house section 10 and trailer 25 as a unit, since the house section is supported by the lifting wings which engage the base frame side members, and the lifting wings are restrained against upward pivotal movement beyond horizontal position by the engagement of their inner edges 77 with the beams 27 and 28.

Each of the aforementioned transverse beams 30a and 30b (respectively aligned with the forward and rearward pairs of lifting wings) bears on its top surface a horizontal bar 79, extending between the beams 27 and 28 and having an upper surface essentially coplanar with the latter beams. The bars 79, respectively in cooperation with the forward and rearward pairs of lifting wings (i.e. disposed in the described horizontal position) and with adjacent upper surface portions of beams 27 and 28, define two effectively continuous planar horizontal tracks extending respectively across the forward and rearward portions of the trailer frame, parallel to each other and perpendicular to the longitudinal centerline of the trailer frame.

Figures 19, 20, 21, 22:
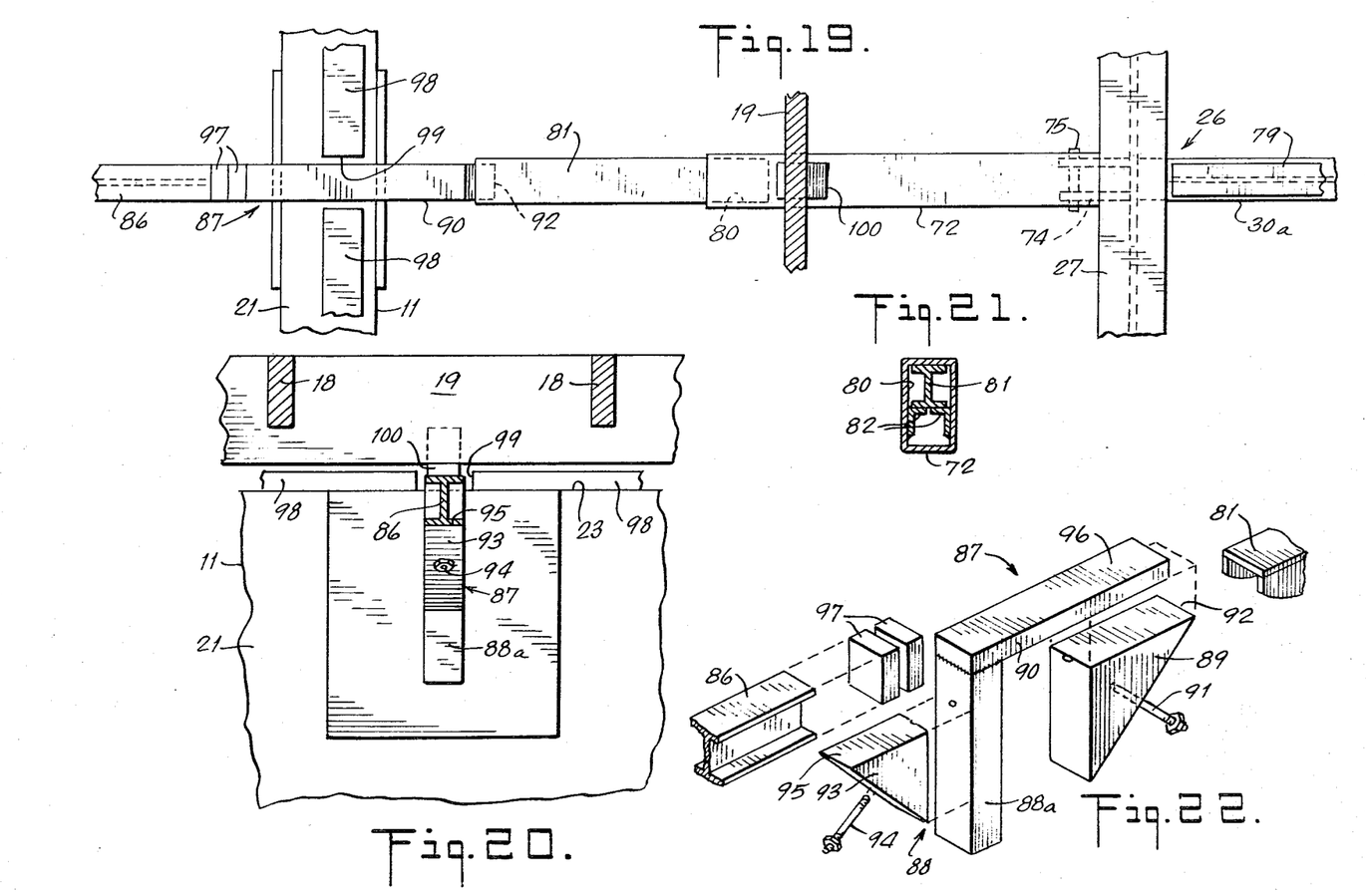
FIG. 19 is a plan view of a lifting wing and track support bracket taken along the line 19-19 of FIG. 14.
FIG. 20 is an elevational view of a track support bracket taken along the line 20-20 of FIG. 16.
FIG. 21 is a cross-sectional view of a lifting wing and extension bar taken along the line 21-21 of FIG. 13.
FIG. 22 is an exploded perspective view of a track support bracket.

The two lifting wings 72 that project outwardly from beam 27 toward the foundation 11 are adjustably extensible. Each of these wings 72 has an axially horizontal, outwardly opening recess 80 within which is slidably mounted an elongated extension bar 81 having a flat upper surface and supported as by horizontal angle members 82 secured to the sides of the wing within the recess 80 (FIG. 21). When the wings 72 are in horizontal position, the extension bars 81 may be slid outward (i.e. toward the foundation) in axially aligned relation to the wings 72, to constitute extensions of the wings 72 having their inner ends respectively supported within the recesses 80 of the wings 72. The upper surfaces of these bars 81, when thus extended, effectively constitute rectilinear extensions of the aforementioned horizontal tracks, projecting toward the foundation.

Mounted on the foundation 11 are two removable beam structures 85, each comprising a rectilinear beam 86 spanning the foundation between the opposite sidewalls 21, and a pair of support brackets 87 respectively secured to the two sidewalls 21 in opposed relation to each other. These beam structures 85, as shown in FIG. 1, are respectively disposed to be aligned with the two lifting wings 72, i.e. when the trailer is moved into its described position adjacent to the foundation and the lifting wings are mounted on the trailer.

As particularly shown in FIGS. 16—20 and 22, each of the support brackets 87 includes an inner bracket member 88 and an outer bracket member 89 respectively bearing against the inner and outer surfaces of the sidewall 21 on which the bracket is mounted. Member 88 comprises an L-shaped element 88a having a horizontal leg 90, extending outwardly across and beyond the upper rim or edge 23 of the sidewall and secured as by a bolt 91 to the member 89, so that the wall 21 is clamped between the bracket members. The upper surface of the member 89 underlies the portion of leg 90 projecting outwardly of the wall 21 and itself projects at least slightly outward beyond the extremity of leg 90, as indicated at 92; this projection 92 is adapted to support the free end of one of the lifting wing extension bars 81. Member 88 also has an element 93 secured as by a bolt 94 to the inner vertical surface of element 88a, and providing an inwardly projecting shelf 95 for supporting one end of a beam 86. The horizontal legs 90 of the two brackets of each beam structure 85 have aligned and essentially coplanar horizontal upper surfaces 96, and the shelves 95 of the brackets are offset downwardly with respect to these surfaces 96.

In each beam structure 85, the beam 86 has its opposite ends supported on the shelves 95 of the brackets 87. The horizontal upper surface of the beam is essentially coplanar with the surfaces 96 of the bracket legs 90 and cooperates therewith to constitute an essentially continuous rectilinear horizontal track extending across the foundation and across the rims 23 of both sidewalls 21 thereof. If the beam 86 is shorter than the distance between the facing inner ends of the two bracket legs 90 (e.g. owing to variations in foundation dimensions), spacer blocks 97 may be interposed between one or both beam ends and the adjacent leg or legs 90. The spacer blocks, each supported on a bracket shelf 95 and having an upper surface essentially coplanar with the leg surfaces 96, fill up any discontinuity that would otherwise exist between the horizontal upper surfaces of the beam 86 and the bracket legs 90.

As in conventional frame house construction, a wooden plate 98 may be mounted on the foundation upper rim 23, extending substantially entirely around the rim. Gaps 99 are provided in the plate at the localities at which the brackets 86 are mounted on the sidewalls 21, and the bracket legs 90 extend through these gaps. The vertical thickness of the legs 90 is so chosen that the upper leg surfaces 96 are at a level lower than the upper surface of the plate.

Figure 13:
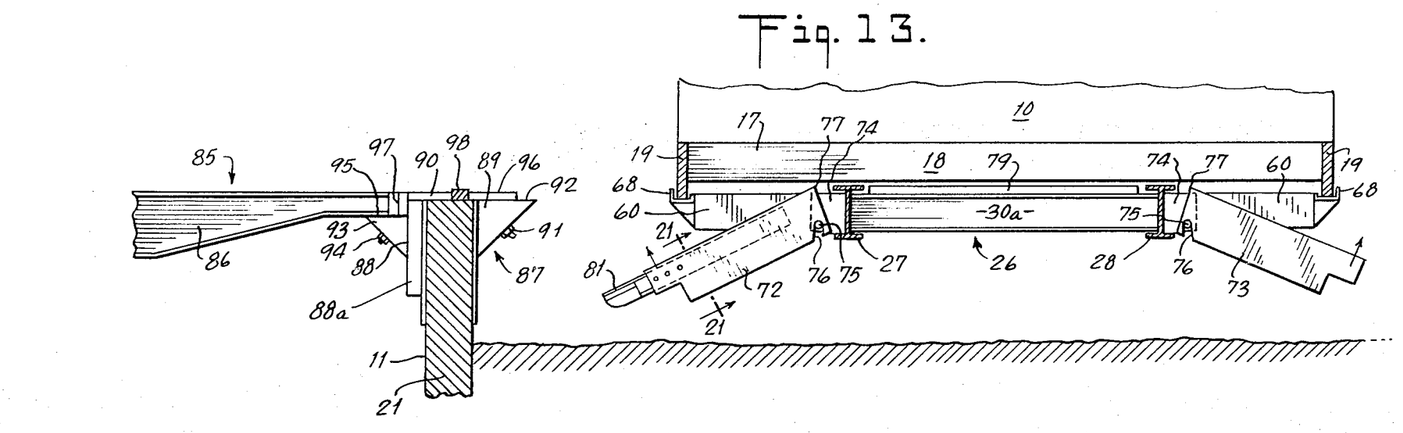
FIG. 13 is a cross-sectional view of the trailer, positioned adjacent to a foundation, showing the lifting wings being pivoted upwardly.
Figure 14:
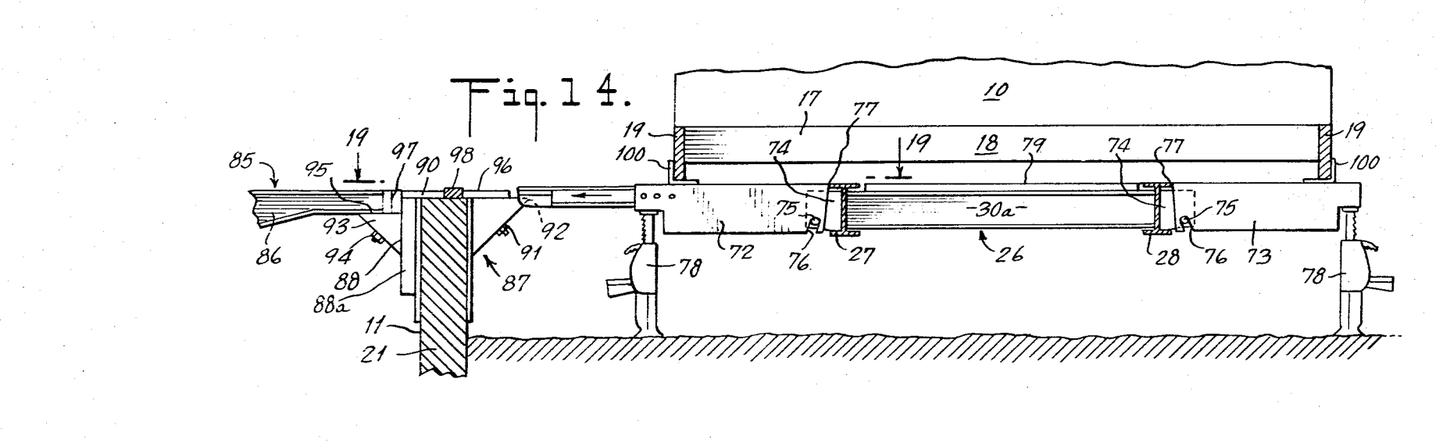
FIG. 14 is a view similar to FIG. 13 but showing the lifting wings in horizontal position and supported by jacks.

The practice of the present method for effecting transfer of the house section 10 from the trailer 25 to the foundation 11 may now be readily understood. After the beam structures 85 have been mounted on the foundation and the trailer has been positioned in adjacent parallel relation to a sidewall 21 of the foundation with the house section properly oriented and aligned for transfer, the lifting wings 72 and 73 are mounted on the trailer by fitting their inner ends over the brackets 74 and engaging the pivot pins 75 with the notches 76 (FIG. 13). The lifting wings are then pivoted upwardly toward their respective horizontal positions.

To this end, jacks 78 are placed beneath each of the lifting wings (FIG. 14) in position to engage the lower surfaces of the wings. The jacks are operated to elevate the lifting wings into their aforementioned horizontal positions, in which they bear upwardly against and support the side members 19 of the house section base frame, and in which their inner edges 77 respectively engage the top flanges of the longitudinal trailer beams 27 and 28.

As the lifting wings are thus pivotally elevated, L-shaped slide elements 100 are interposed between each of the lifting wings and the bottom edges of the base frame side members 19. Consequently, when the lifting wings reach their limiting horizontal positions, the base frame side members 19 rest on the slide elements 100, which in turn rest on the upper surfaces of the lifting wings 72 and 73.

The house section 10 is now fully supported by the four lifting wings, which are themselves supported by the jacks. Since the load-supporting wings 60 are no longer loaded, the longitudinal trailer beams 27 and 28 are no longer bowed, but again become axially horizontal. At this point the load-supporting wings may be detached from the trailer by removing the bolts 66, so as not to interfere with transfer of the house section.

Ordinarily, the trailer when resting on its wheels 32 is at a level lower than the foundation level; i.e. the horizontal plane containing the upper surfaces of beams 27 and 28 is lower than the plane containing the upper surfaces of the beam structures 85. To overcome this difference in level, the trailer and house sections are raised as a unit by again operating the jacks 78 to elevate the lifting wings. Such operation is possible because the lifting wings, abutting the longitudinal beams 27 and 28, are locked against further upward pivotal movement so that the lifting wings and trailer frame 26 together constitute an effectively rigid horizontal platform. As will be understood, the initial difference in level (and hence the extent of elevation required) may vary from foundation to foundation, depending on such factors as the nature of the surrounding terrain; the jacks 78, which may be conventional in character, are operable to provide the precise extent of elevation necessary in each particular case.

When the trailer has been raised to a level at which the upper surfaces of the beams 27 and 28 and lifting wings 72 and 73 are substantially coplanar with (or very slightly higher than) the upper surfaces of the beam structures 85, the extension bars 81 of wings 72 are slid outwardly from the recesses 80 until the outer free ends of these extension bars respectively engage the projections 92 of the two bracket members 89 mounted on the side of the foundation facing the trailer. As particularly shown in FIG. 22, the outer ends of the bars 81 are shaped to form downwardly opening channels dimensioned to fit over and bear against the upper surfaces of the projections 92. The extended bars 81 are thus supported at their outer ends by the bracket members 89 on the foundation sidewall, while still being supported at their inner ends by the wings 72. The amount of extension of the bars 81 is variable, and hence the spacing between the trailer and the foundation is not critical as long as the trailer is close enough to the foundation so that the bracket members 89 are within reach of the bars 81.

Once the bars 81 are extended, the trailer 25 and the beam structures 85 together provide a pair of substantially planar horizontal tracks extending across the trailer frame and the foundation, in spaced parallel relation to each other, and in perpendicular relation to the longitudinal centerline of the house section 10. Each of these tracks comprises the upper surfaces of a wing 73, a portion of beam 28, a bar 79, a portion of beam 27, a wing 72, an extension bar 81, a leg 90 of a first support bracket 87, a beam 86, and a leg 90 of a second support bracket 87. Transfer of the house section from the trailer to the foundation is now effected by sliding the house section, on the slide elements 100, along these tracks from the trailer to the foundation, in a direction parallel to the tracks. This sliding movement of the house section is illustrated schematically in FIG. 1 as performed by means of a pair of cable and pulley mechanisms 104 respectively positioned at opposite ends of the house section and operated by a corresponding pair of cranks 105.

The thickness of the slide elements 100 on which the base frame members 19 rest is greater than the vertical difference in level between the upper surface 96 of the bracket legs 90 and the upper surface of the plate 98. Consequently, as the house section slides along the tracks on the elements 100, over the surfaces of bracket legs 90 (which extend through the gaps 99 in the plate 98), the slide elements support the bottom edges of the base frame of the house section at a level sufficiently high to clear the plate.

Figure 15:
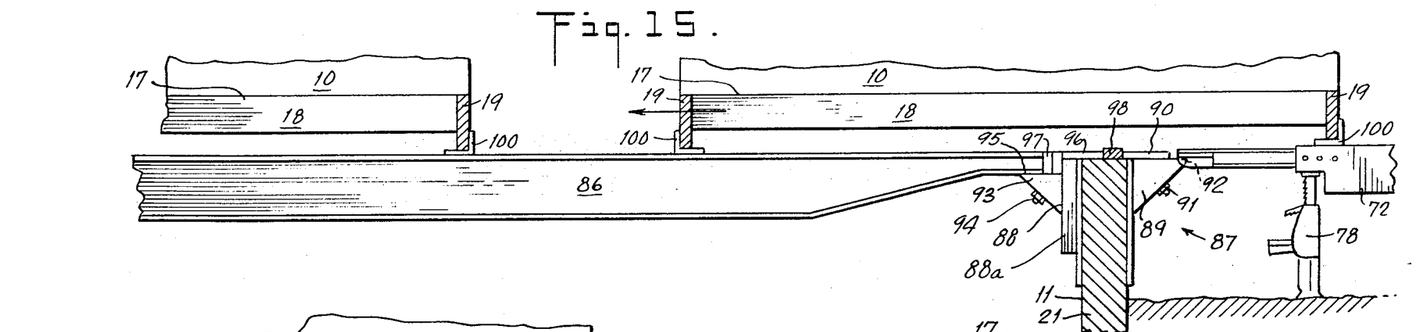
FIG. 15 is a view of a house section being slid from the trailer onto a foundation.

After the house section has been slid to its final position on the foundation, the jacks 78 may be operated to lower the trailer again to the ground, the lifting wings 72 and 73 may be detached from the brackets 74, and the trailer may be moved from the foundation site. A second house section 10 may then be transferred from a trailer to the foundation (as shown in FIG. 15), in the same manner described above, to provide a complete house on the foundation.

Figures 16, 17, 18:
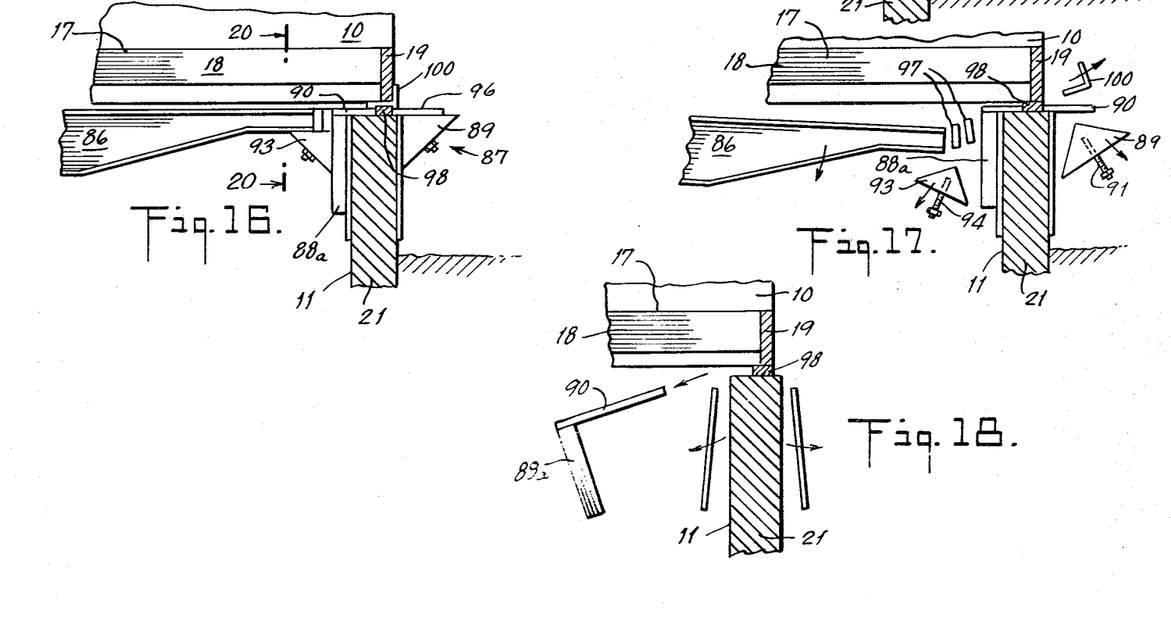
FIG. 16 is a sectional elevational view of a support bracket for a track mounted on a foundation wall.
FIG. 17 is a view similar to FIG. 16, illustrating disassembly of the track and support bracket after a house section is in place on the foundation.
FIG. 18 is a view similar to FIG. 17, showing a further stage in the disassembly of the support bracket.

When both house sections are in place on a foundation, the outer side frame members 19 and the end frame members 20 of their base frames are positioned directly above the plate 98 (FIG. 16). The house sections are pried up sufficiently to enable removal of the slide elements 100 (FIG. 17), which are resting on the bracket legs 90, so that the base frame side members 19 and end members 20 come to rest on the plate 98. The house is now in its final, permanent position on the foundation.

Owing to the fact that the upper surfaces 96 of the bracket legs 90 are at a level lower than the upper surface of the plate 98, there is still clearance between the bracket legs 90 and the base frame members 19 in the plate gaps 99 even after the house sections have been thus lowered onto the plate. The bracket members 89 and 93 are now removed by unscrewing the bolts 91 and 94, and the beams 86 and spacer blocks 97 are also removed (FIG. 18). Thereafter, the L-shaped inner bracket elements 88a are pulled inwardly (FIG. 18), drawing the legs 90 through the gaps 98 in the plate, to remove these elements 88a from the foundation walls. In this way, the beam structures 85 are dismantled and removed from the foundation and may be reused on another foundation.

We claim:

1. A method of transferring a rigid house section or like structure from a wheeled trailer to a foundation having parallel sides and ends, said house section having a generally rectangular base frame with sides overhanging the sides of said trailer, the upper surface of said trailer providing a horizontal platform lying essentially in a single plane, and said foundation having an upper rim higher than said plane, said method comprising:
    a. wheeling said trailer into a position, adjacent to said foundation, in which the sides of said base frame are parallel to the sides of said foundation and the ends of said base frame are aligned with the ends of said foundation;
    b. pivotally mounting a first pair of lifting wings on opposite sides of said trailer at a forward locality thereon, and a second pair of lifting wings on opposite sides of said trailer at a rearward locality thereon, and pivoting said lifting wings upwardly to positions in which said lifting wings extend substantially horizontally outward from said trailer in engaging and supporting relation to the opposite side edges of said base frame, said lifting wings supportably engaging said trailer so that said trailer is liftable therewith while said lifting wings are maintained in horizontal position relative to said trailer, the forward and rearward lifting wings on the side of said trailer facing said foundation being extensible to the adjacent side of said foundation;
    c. supporting said lifting wings on jacks and operating said jacks to elevate said lifting wings, said trailer and said base frame together to the level of said foundation upper rim;
    d. extending said extensible lifting wings to the side of said foundation, the upper surfaces of said extensible lifting wings being essentially coplanar with said trailer upper surface; and
    e. sliding said house section across said trailer upper surface and said extensible lifting wings, in an essentially horizontal direction perpendicular to the sides of said base frame, onto said foundation.

2. A method according to claim 1, further including the steps of transporting said house section on said trailer to the site of said foundation from a remote locality by
    a. positioning said house section on said trailer at said remote locality, said trailer being provided with two pairs of rigidly secured but detachable support wings respectively disposed at forward and rearward localities of said trailer and each including two wings respectively extending outwardly from opposite sides of said trailer for engaging and supporting the sides of said base frame;
    b. vertically separating said base frame from the subjacent support wings for effecting downward bending of the forward and rearward ends of said trailer relative to the central portion of said trailer until said base frame bears against said central portion, and maintaining said base frame fixed in said vertically separated relation to said support wings;
    c. connecting said trailer to a powered vehicle and drawing said trailer, by means of said powered vehicle, in a direction parallel to the sides of said base frame, from said remote locality to said foundation site; and
    d. after positioning said lifting wings in supporting and engaging relation to said base frame, removing said support wings from said trailer.

3. A method according to claim 1, including the step of positioning a pair of horizontal rectilinear tracks across the foundation, said tracks extending in parallel relation to each other over the rims of both sides of the foundation and being so disposed as to be aligned with said extensible lifting wings when said wings are extended, said trailer being elevated to a level substantially coplanar with the upper surfaces of said tracks, and said house being slid successively across said extensible lifting wings and said tracks into its final position on the foundation.

4. A method according to claim 3, wherein each of said tracks includes a portion projecting horizontally outward toward said trailer from the side of said foundation adjacent to said trailer, and including the step of extending the outer end of each of said extensible lifting wings into bearing engagement with the projecting portion of the track aligned therewith.

5. A method according to claim 3, including the step of interposing slide elements between said first and second pairs of lifting wings and said base frame side edges as said lifting wings are pivoted upwardly into supporting relation to said base frame side edges to that said base frame is spaced above said lifting wings by the thickness of said slide elements, said slide elements moving with said base frame over said extensible lifting wings and said tracks.

6. A method according to claim 4, wherein a plate is mounted on said foundation upper rim, said plate having gaps through which said tracks extend, the upper surfaces of said tracks being lower in elevation than the upper surface of said plate, said slide elements having a thickness sufficient to elevate the lower edge of said base frame slightly above the upper surface of said plate as said base frame and slide elements are slid across said tracks, said slide elements being narrower than said gaps in said plate.

7. A method according to claim 5, further including the steps of prying up said house section, after said house section is in position on said foundation, removing said slide elements so that said base frame rests on said plate, and disassembling and removing said tracks from said foundation.

8. In a method of transferring a house section or like structure having a generally rectangular base frame from a horizontal platform to a parallel-sided foundation having a plate mounted on its upper rim, said platform being disposed substantially at the level of the foundation rim and having portions extending to the adjacent side of said foundation, the steps of
    a. positioning a pair of spaced parallel horizontal tracks on said foundation, said tracks extending across said foundation from said platform portions, said plate having gaps through which said tracks extend across the upper rim of said foundation at both sides of said foundation, the upper surfaces of said tracks being substantially coplanar with the upper surface of said platform and lower than the upper surface of said plate;

b. interposing a plurality of slide elements between said platform and the side edges of said base frame, in aligned relation to said tracks, so that said base frame is spaced above said platform by the thickness of said slide elements, said slide elements having a thickness greater than the vertical spacing between said track upper surfaces and said plate upper surface so as to elevate the lower edges of said base frame above the plate;

c. sliding said house section together with said slide elements over said platform and said tracks in a direction parallel to said tracks, into the final position of said house section on said foundation; and d. prying up said house section and removing said slide elements so that said base frame rests on said plate.

9. A method according to claim 8, wherein said platform comprises a wheeled trailer which, when supported on the wheels of said trailer, is at a level lower than said foundation upper rim, and wherein said extending portions of said platform comprise outwardly extensible elements mounted on said trailer; and including the steps of:

a. wheeling said trailer into a position adjacent to a side of said foundation over which said tracks extend;

b. jacking up said trailer to elevate said trailer, together with said house section, substantially to the level of said foundation upper rim, said extensible elements being retracted inwardly away from the last-mentioned side of said foundation; and c. extending said extensible elements outwardly from said trailer to the last-mentioned side of said foundation.